June 10, 1969     R. E. WHITE     3,449,046

FILM CODE ANNOTATING MEANS

Filed Jan. 4, 1967

*INVENTOR.*
ROBERT E. WHITE
BY *James P. Malone*

United States Patent Office 3,449,046
Patented June 10, 1969

3,449,046
FILM CODE ANNOTATING MEANS
Robert E. White, Westbury, N.Y., assignor to OPTOmechanisms, Inc., Plainview, N.Y.
Filed Jan. 4, 1967, Ser. No. 607,194
Int. Cl. G03b 27/00
U.S. Cl. 355—1                                                3 Claims

ABSTRACT OF THE DISCLOSURE

An apparatus for annotating camera film with code masks. A fiber optic cable connects the camera and lens to an encoding mask and light source. A moveable shutter is located between the encoding mask and the light source for selectively covering and uncovering openings in the encoding mask.

---

The present invention relates to means for placing code marks on film in a camera as pictures are taken.

More particularly, the invention relates to means for placing digital code information on film in one or more cameras from a remote location.

In the taking of aerial surveys or their interpretation it is desired that the frames of the film be marked with various information such as coordinate data, elevation, altitude, and other miscellaneous information.

The present invention provides means to place a code block of marks containing the necessary information. The code block may then be automatically read at a later time similarly to the reading of a punched data card.

It is also desirable to be able to simultaneously and identically mark film in different cameras, for instance where stereoscope pictures are taken.

The present invention generally comprises a light coding device which may include one or more lamps and a mask. The coded light is transmitted by fiber optic cables to one or more cameras. A lens at the camera focuses the code block onto a predetermined portion of the film, for instance in one corner of the film frame.

More specifically, this invention provides means for the annotation of photographic film with digital data while it is still in the camera. The device described may be used with a code block system in accordance with the military specification MIL–STD–782 B, but the technique is applicable to other annotation problems.

The system consists basically of three parts:
(1) A light source matrix with exposure control.
(2) Fiber optic transmission cables with connectors as necessary.
(3) A camera mounted terminal which includes the necessary optical components to image the digital pattern on the film.

The light source matix consists of an array of illumination sources. In the present application these are miniature incandescent lamps. Each source represents one bit of digital data. Each source can illuminate an area of a "fiber optic terminal plate," the position of the illuminated area depending upon the position of a series of shutter plates or masks.

The object of the above mechanisms is to selectively illuminate the ends of one or more fiber optic cables mounted in the "fiber optic terminal plate" in accordance with the actuation of the appropriate shutter plate. The shutter plates may have various aperture configurations similar to an IBM type card.

By energizing an actuator, such as a solenoid, connected to the shutter, a corresponding area of the fiber optic terminal plate may be selectively illuminated.

The fiber optic terminal plate holds the ends of the fiber optic cables; one in each of the possible areas of illumination. The purpose of illuminating selectively various fiber optic cables from the same light source is to permit the same data bit transmission to different camera locations. The above arrangement is duplicated in this system as many times as required to transmit the desired data.

Accordingly, a principal object of the invention is to provide new and improved coding means for film.

Another object of the invention is to provide new and improved means for coding film in a camera from a remote location.

Another object of the invention is to provide new and improved coding means for placing digital data on film in one or more remote cameras.

Another object of the invention is to provide new and improved coding means for placing digital data on film in one or more remote cameras including a light source, as mask, a fiber cable and lens means in the camera adapted to receive the coded light and focus it on a certain portion of the film frames.

Another object of the invention is to provide new and improved means for annotating film in a camera comprising, a light source, a location remote from said camera, encoding means connected to said source, a fiber optic cable having an input face and an output face and having its input face located behind said encoding means to receive encoded light, said output face of said cable being connected to said camera, a lens in said camera adapted to focus the encoded light from said output face onto said film whereby said encoded information is recorded on said film.

These and other objects of the invention will be apparent in the following specifications and drawings of which:

Figure 1:
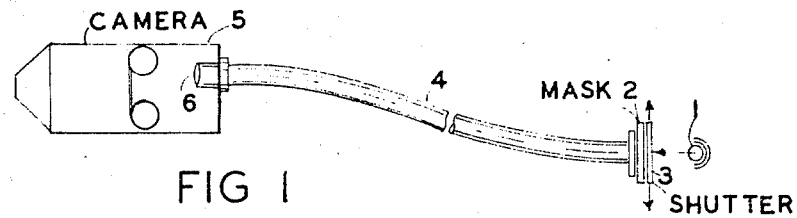
FIGURE 1 is a diagram of an embodiment of the invention.

Referring to FIGURE 1 the invention generally comprises a light source 1 which is adapted to illuminate a mask 2 which has suitable placed apertures to provide the desired code. The mask preferably has a shutter 3 which is adapted to be remotely controlled. The coded light output from the mask is connected by a fiber optic cable 4 to a remote camera 5. Inside the camera is mounted a lens 6 which is adapted to focus the coded data onto the film F.

Figure 2:
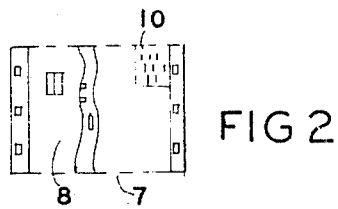
FIGURE 2 is a detail view of a coded film frame.

FIGURE 2 shows a typical film frame 7 showing a pictorial representation 8. In the upper right hand corner appears the coded data 10 which is represented by a series of spaced dots. It is understood that the coding may be as extensive as required. For instance the field of dots may be 5 lines by 5 lines or 10 lines by 10 lines, as desired, to corporate the necessary information which can later be read by suitable reading apparatus in the same fashion as punched data cards.

Figure 3:
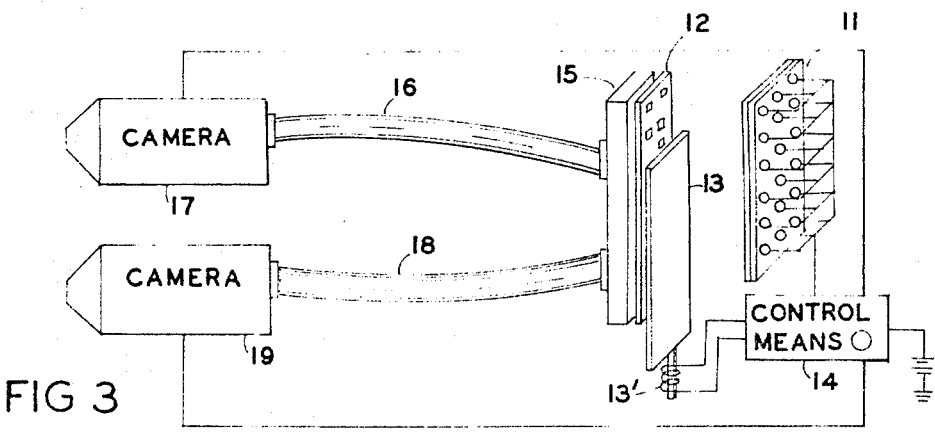
FIGURE 3 is a schematic diagram of another embodiment of the invention.
Figure 4:
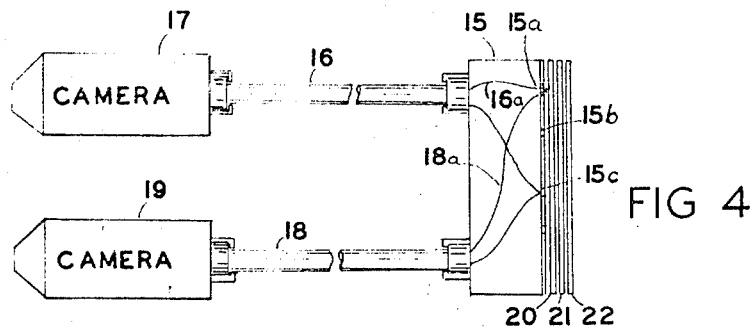
FIGURE 4 is a detail view illustrating a terminal plate and mask.

FIGURE 3 shows another embodiment of the invention which is similar in principle to that of FIGURE 1 but which shown means to apply the same code to a plurality of cameras. In this embodiment the light source 11 may be an array of small light bulbs each adapted to illuminate a certain area of the mask 12. The shutter 13 is adapted to expose the mask in accordance with a signal from the control means 14 which energizes solenoid 13'. The output of the mask is connected to a terminal plate 15, details of which are shown in FIGURE 4. The fiber optic cable 16 goes to a camera 17 and another fiber optic cable 18 goes to a camera 19, etc. Terminal plate 15 has a series of apertures 15a, 15b, 15c, etc. One or more filaments of each cable are connected to each aperture, for instance the filaments 16a and 18a are connected to the aperture 15a inside the terminal plate assembly.

Therefore when the mask is illuminated each camera will receive the identical code information. A plurality of masks 20, 21, 22 may be overlaid on each other to secure various combinations of coding.

The fiber optic cable in the subject system may consist of single strands of flexible light transmission filament. The filament consists of a transparent material coated with a transparent material of higher index of refraction so that light entering the end of the cable at angles less than approximately 30 degrees from the axis are totally reflected by the surface layer and proceed along the filament by successive reflections with little light loss. The filament chosen for one particular embodiment was flexible plastic product made by Du Pont under the trade name of "Crofon." This filament is 20 miles in diameter and is sufficiently rugged to withstand the normal handling and operation environments. There is one fiber for each data bit.

The use of the flexible optic cable allows the transmission of data over reasonable distances and the rearrangement of the terminal code matrix patterns. In this application the latter feature is of primary importance. The code light matrix is of a size consistent with the size of the available illumination sources, for instance lamps 1/16 to 1/8 of an inch in diameter require a matrix size of approximately 3½ x 4½ inches while the annotator camera terminal has a much smaller matrix size of 3/8 x 5/8 of an inch approximate size. A typical system may transmit 576 data bits.

Connections in the fiber optic cable preferably permits the cable to be parted and the equipment connected to the sending and receiving terminals removed. These connections are formed simply by having two plates 23, 24 with the same pattern of holes and having suitable clamping means. Each hole in one plate corresponds accurately in location to a hole in the other plate. The corresponding pair of holes are used to locate the ends of the same data bit cable so that when properly assembled, the light path through the cable is interrupted by only the small gap between the cable ends. Corresponding connection means are preferably provided at each end of the cable. These connections can also be used to connect cables together.

The annotator camera terminal end consists of a marking plate with holes in a pattern suitable to the data annotation scheme. In addition, there is a lens which projects the hole pattern matrix on the film plane. In one embodiment, the terminal plate pattern was approximately the same size as the pattern projected on the film, although this is not a general requirement. Each hole in the terminal plate serves as a mount for one of the fiber optic filaments.

Since a number of filaments may be exposed to illumination by a single light source, corresponding to a data bit, a number of identical, or different format, code matrix annotators may be driven from the same lamp matrix.

Many modifications may be made by those who desire to practice the invention without departing from the scope thereof which is defined by the following claims.

I claim:

1. Means for annotating film in a camera comprising, a light source at a location remote from said camera, a coding means connected to said light source comprising an opaque mask having an opening therein, a moveable shutter mounted between said light source and said mask to cover and uncover said opening, a fiber optic cable having an input face, said opening being in optical alignment with the input face of said fiber optic cable, and an output face and having its inputs face located behind said encoding means to receive encoded light, said output face of said cable being connected to said camera, a lens in said camera adapted to focus encoded light from said output face onto said film whereby said encoded information is recorded on said film.

2. Apparatus as in claim 1 wherein said encoding means includes control means connected to control said light source and said shutter.

3. Apparatus as in claim 2 having a plurality of cameras and a plurality of fiber optic cables, fiber optic terminal box means, the input faces of said fiber optic cables being connected to said terminal box means, and the individual strands of said fiber optic cables being connected in parallel within said terminal box means, each of said cables connecting one each of said cameras to said terminal box means.

References Cited
UNITED STATES PATENTS 2,907,985 10/1959 Doersam et al. _____ 95—1.1
3,029,717  4/1962 Hildebrandt _____ 95—1.1

NORTON ANSHER, *Primary Examiner.*

D. B. WEBSTER, *Assistant Examiner.*

U.S. Cl. X.R.
352—92